INVENTOR.
OTTO M. BURKHARDT
BY Milburn & Milburn
ATTORNEYS

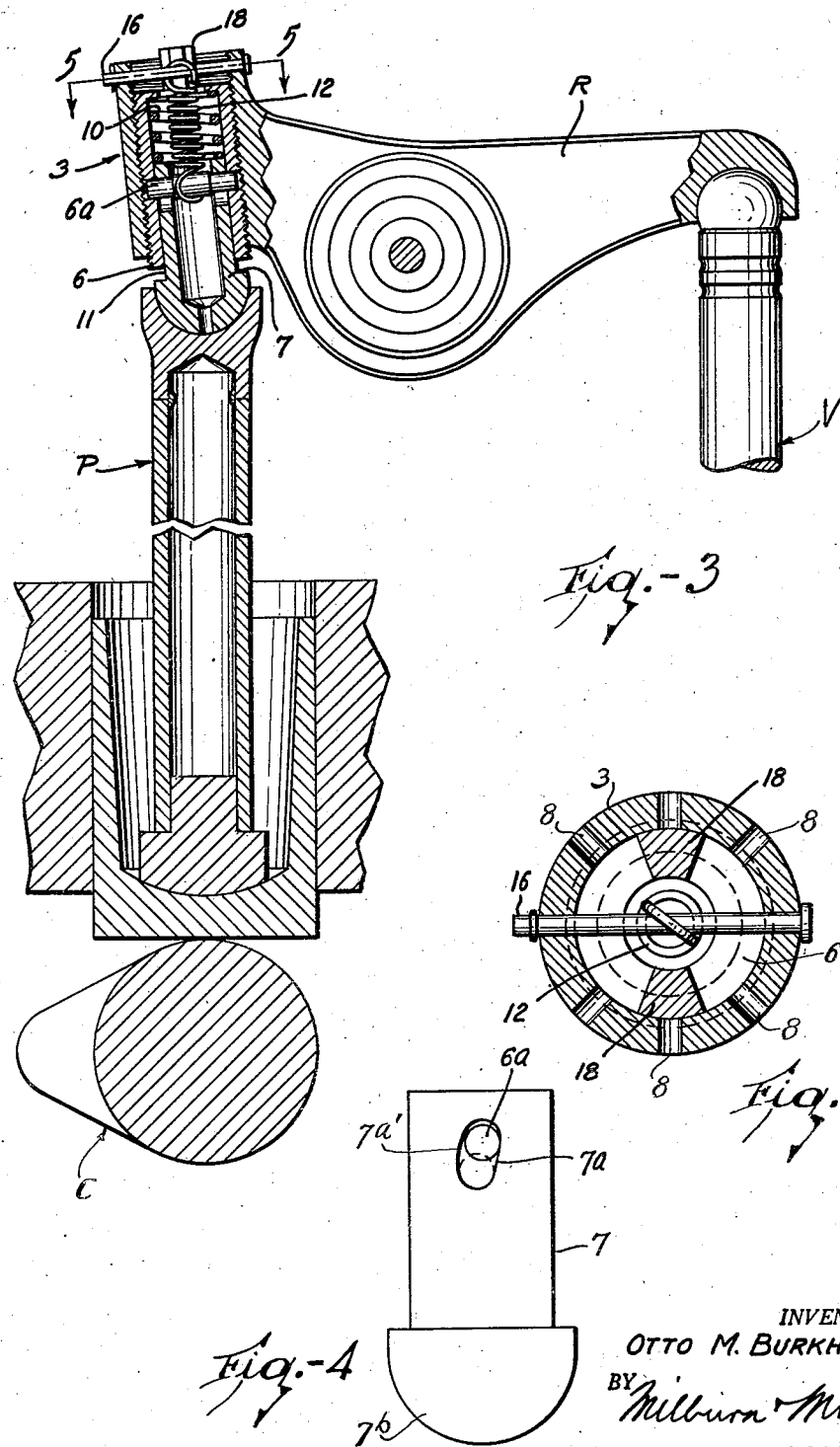

Patented Nov. 26, 1946

2,411,650

UNITED STATES PATENT OFFICE 2,411,650

VALVE LINKAGE

Otto M. Burkhardt, Euclid, Ohio

Application March 25, 1943, Serial No. 480,430

17 Claims. (Cl. 123—90)

This invention relates to the art of internal combustion engines and especially the valve linkage thereof.

The valve mechanisms of internal combustion engines, especially those of the air-cooled type as extensively and successfully used in aircraft, have to be provided with a certain clearance in order to allow for expansion and contraction of the various co-acting parts. Conventional manually adjustable valve mechanisms have to be securely locked after being adjusted, lest all of their inherent difficulties be greatly aggravated. Devices for automatically regulating this clearance are well known and instances of such devices are found in my own United States Patents No. 1,916,191, No. 1,948,063, No. 2,200,152, No. 2,222,138 and No. 2,283,536, in which the objects and functions of such devices are fully explained.

To those who are familiar with the functions of high-speed valve mechanisms, it is well known that the motion of the valve is the resultant of two motions; namely, that determined by the contour of the cam surface which actuates the valve linkage, and such motion as is sometimes referred to as "false motion" and originates in the yield and the restitution of this yield within the linkage. The latter motion is better known as "surge" of the linkage or as "valve bounce," as more fully explained in the S. A. E. Journal of March 1939, page 109.

Now, no matter what improvements are made in this connection, it still remains very important that, during the entire valve-lift, all linkage members remain securely held together; and this constitutes a distinguishing characteristic of the present invention. It is evident that any looseness in the linkage would aggravate the surge or false motion or false clearance or cause untimely adjustment of the clearance regulator, these difficulties being experienced more or less in all valve mechanisms. Large clearances in high speed mechanisms cause heavy impacts, noise and failures. In order to obtain high efficiency in high speed internal combustion engines, the valves must be opened and closed quickly and at exact intervals of the cycles, and they must not be held open or even be unduly late in closing. Obviously these requirements necessitate precise motion and under very high pressures which, however, are a cause of surge. High pressures are the result of three factors: (1) design of the cam contour; (2) mass of the valve linkage; and (3) the square of the revolution speed of the motor.

In the interest of high power output, the cam contour must be designed so as to impart high accelerations. For the same reason, the revolution speed of the motor must be high. However, there remains one recourse for the engine designer to reduce the pressure and hence the yield and surge within the valve linkage and that is to design the reciprocating parts with respect to weight within the bounds of safety. But these efforts are entirely limited. For instance, a lighter linkage means more yield which in turn induces surge or valve rebound. Or, if a designer adds to the valve linkage a clearance regulator with the thought of controlling and relieving the situation and if the regulator be of undue weight, it is quite possible that this added weight will cause actual harm to the motion of the valve and so preclude the benefit that it is intended to produce.

While I previously recognized the possibility of avoiding the aggravation of surge, yet none of my prior regulators nor any other device, known to me, was ever conceived or so constructed as to co-act with other parts of the valve linkage in such manner as to actually prevent or eliminate surge and other undesirable phenomena from the motion of the valve and its linkage, this further accomplishment being true of my present invention only, so far as I am aware.

Accordingly, one object of my present invention is to devise a method and means for actually preventing any undue rise in pressure in the valve linkage which may be the result of either excessive clearance or dynamic disturbances in the valve linkage, thereby eliminating surge and other objectionable motions from the desired motion of the valve and its linkage in an internal combustion engine.

As a means of accomplishing the general object of the present invention, as just now briefly stated, there are contemplated several other objects which will also be briefly mentioned.

One of these other objects is to so devise a clearance regulator that a certain motion thereof, together with another feature to be later described, will break up the surge in the valve linkage and ensure more precise valve motion and consequently substantially reduce or entirely eliminate valve rebound and valve noise and prevent pumping open of the valve.

Another of these objects is to ensure a precise valve lift which starts and stops at predetermined intervals of each cam shaft rotation, under all reasonable conditions. More specifically, my clearance regulator is so conceived as to become a virtual unit, with every part substantially locked by pressure from the beginning to the end of the valve movement. That is, it is contemplated that any additive or subtractive adjustment which the clearance regulator is to perform, takes place only while the valve is firmly upon its seat; so that neither surge within the linkage nor any motion of any linkage member, other than that determined by the geometry of the cam contour, will take place during the period of valve movement. Thus precise valve timing is assured.

Another of these objects is to devise a clearance regulator that is capable of highly efficient operation and that is of such weight that it will either add not any or only an insignificant amount of mass to the valve linkage and is hence particularly well adapted for the accomplishment of the object above stated.

Still another of these objects is to provide a dwell period or periods during the operation of the valve linkage so as to relieve or remove the cause of surge; which object may be accomplished by a specific designing of the surface contour of the cam flank itself which effects actuation of the valve linkage. This is the other feature that is above referred to in connection with the automatic clearance regulator.

It is also an object of this invention to so devise a clearance regulator that a certain incidental motion within the same will serve in an especially efficient manner to facilitate the starting of the engine.

Other objects will appear from the following description and claims when considered together with the accompanying drawings.

Fig. 3 is a vertical sectional view of the automatically adjustable clearance regulator that forms part of the present invention;

Fig. 4 is an enlarged side elevation of one member thereof; and

Fig. 5 is a sectional view taken on line 5—5 of Fig. 3.

Figure 1:
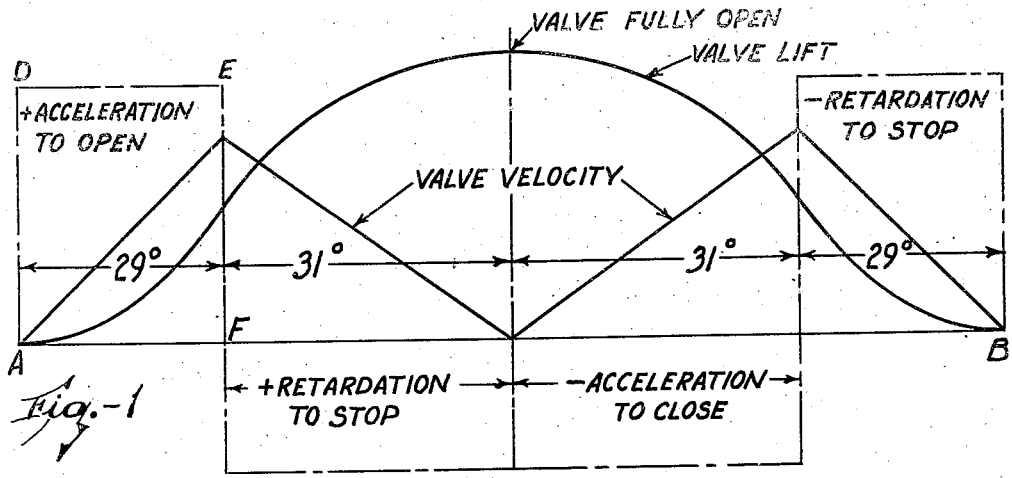
Fig. 1 is a diagram illustrating the periods of acceleration and retardation during the opening and closing of the valve.

It is to be understood that the present form of disclosure is merely for the purpose of illustration and that there might be devised various modifications thereof without departing from the spirit of the invention as herein set forth and claimed.

In view of the fact that clearance regulators have been embodied in valve linkage mechanisms and such organizations in general are therefore familiar to those who are conversant with the prior art, I will first describe my present improved form of automatic clearance regulator so that it may first be fully and clearly understood how this particular form of regulator is particularly well adapted for co-ordination with the other feature, to be later described, in the accomplishment of a particularly improved result which constitutes the purpose of this invention—namely, to effect a precise and smooth valve-lift through the elimination of undue pressures and the consequent yield, restitution, surge and valve rebound.

Referring to the drawings, there is indicated at 3 the push rod end of the conventional rocker arm R which, as is customary, is provided with a screw-threaded hole. Screwed into this hole is the hollow cylindrical adjusting screw member 6, within which there is mounted a constant-clearance hollow element 7 having a spherical end 7b, for contacting the conventional push rod P, and a cylindrical sleeve portion which is provided with two inclined oblong slots 7a located diametrically opposite each other. Element 7 is located within the adjusting screw member 6 by a pin 6a which has its ends mounted in member 6 and extends through slots 7a. Spring 10 is so placed between members 6 and 7 that it constantly urges the latter to telescope outwardly and it thereby urges the valve end of the rocker arm to remain in firm contact with the valve; and the push rod, through the tappet, is held in firm contact with the cam C. This action is limited by pin 6a coming to the end of inclined slots 7a, and this limitation ensures the constant clearance 11. Any adjustment beyond clearance 11 is accomplished by torque spring 12, one end of which is anchored on pin 16 which in turn is mounted in suitable holes 8 in the end 3 of the rocker arm R, while the other end of spring 12 is anchored on pin 6a which in turn is anchored in adjusting screw member 6.

The upper end of adjusting screw member 6 is provided with two diametrically opposite prongs 18 which serve a triple purpose, as will be explained. First, pin 16 is set in a definite relation to the prongs 18. When this relation changes during operation, it serves at once as a visual means or tell-tale that an adjustment may be desirable; whereas, with conventional valve mechanisms, the motor has to be warmed up before its condition with respect to adjustment can be determined accurately. Second, if the mechanism is utterly neglected for a long time, or in case of failure of any part, prongs 18 will abut against pin 16 which provides a definite stop analogous to the locking means of the manual adjustment. Third, the prongs 18 serve as a means for removing, inserting or manually adjusting the regulator if and when required.

I will now describe one complete cycle of operation of my present device, as thus far set forth. The cam C, through the tappet, urges the push rod P in the direction of opening the valve V. Member 7 is then being pushed into member 6, and the straight edges of slots 7a slide along pin 6a. Inasmuch as slots 7a are inclined relative to the axis of the motion, member 7 will undergo a slight angular motion induced by their engagement with pin 6a. The reaction of this motion will be imparted to pin 6a which will tend to turn the adjusting screw member 6 in the opposite direction; and this tendency to turn member 6 will be utilized to prepare this member for the shock that is to come. Frequently sudden pressure changes thread connections a small amount, but the aforesaid pressure in the present case prevents any such small amount of screwing together between the members. The resistance which member 6 offers to member 7 while the latter telescopes into the member 6, has a tendency to exert a pressure on the threads of member 6 which are an instant later to transmit the pressure required to open the valve.

When the main acceleration is imparted to the linkage in conventional mechanisms, at first the valve will not open as quickly as expected because of yield in the linkage. Then, as this yield in the linkage progresses, the velocity of the valve will be less than required for a true kinematic relationship between the driving and driven members. Consequently, the pressure must rise beyond that determined by the cam acceleration in order to make up for lag in velocity and travel, the increase in pressure causing more linkage-yield until a balance is reached. Any excess pressure in the linkage will increase the velocity of the valve beyond that required for true kinematic relationship, this being the basis for what is above referred to as surge in the valve linkage and also the cause of abnormally high valve-closing velocities and consequent rebound of the valve.

But this yield and restitution within the valve linkage and the consequent lag and gain in valve velocity is periodic and can be broken up by an aperiodic force and thereby relieved if not entirely eliminated. In order to break up the surge in the linkage and to ensure more precise valve motion, two precautions are taken in the present provision. First, I have provided aperiodic acceleration of the linkage to permit restitution of yield before this unavoidable condition causes surge. Aperiodic acceleration is here attained by breaking up the conventional continuous acceleration into periods of action each followed by a period of rest to permit the energy stored up in the linkage to spend itself usefully at intervals rather than to permit it to speed up the linkage beyond the point determined by the kinematic relationship between the cam and valve, with the consequent objectionable result above referred to. Proceeding upon the theory that surge is due to yield and restitution within the valve linkage, I will now explain this particular precaution which I propose to take in order to prevent or eliminate this objectionable condition.

Figure 2:
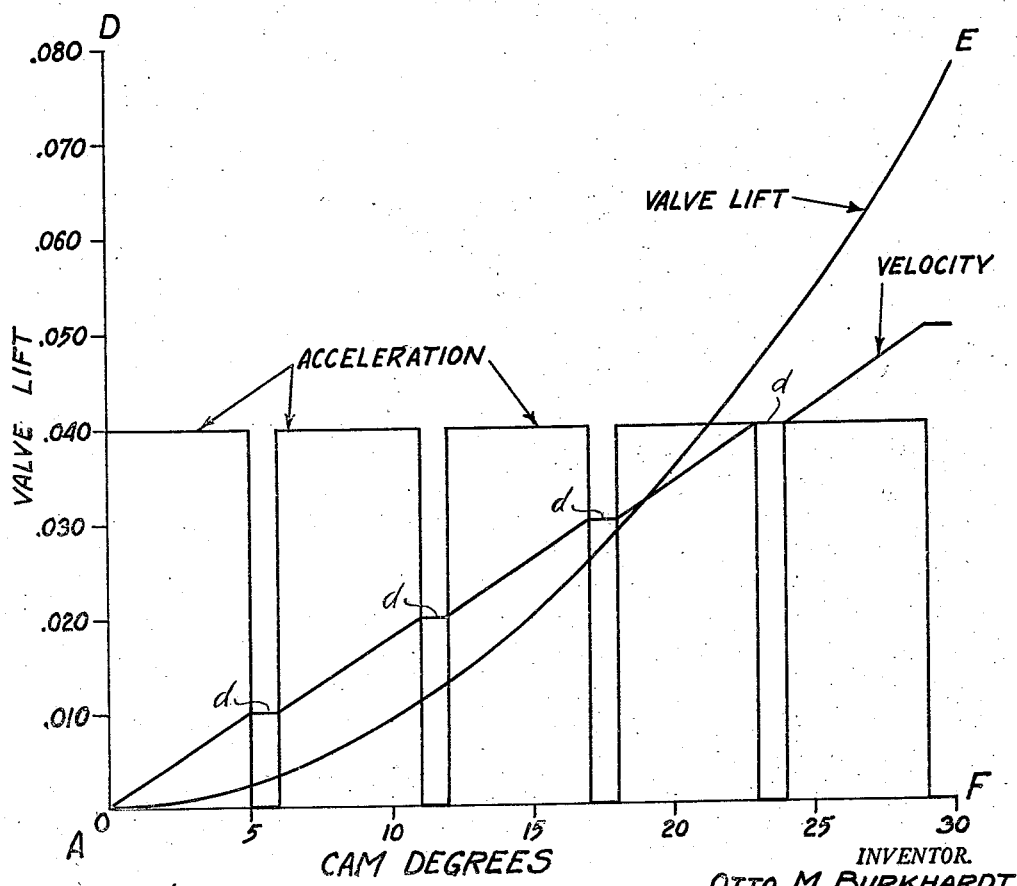
Fig. 2 is a graphic illustration of my provision of dwells in an acceleration period and the corresponding lift curve and velocity of the valve.

Referring to Figs. 1 and 2 of the present drawings, let the distance A—B represent a cam angle of about 120 degrees which is approximately the length of the valve lift exclusive of the ramps. During this lift it is my purpose to have no other motion in any part of the linkage including the clearance regulator except that induced by an acceleration which lasts approximately 29 degrees and is followed by about 31 degrees of retardation, and then the valve is fully open. Now, instead of having the plus acceleration come in one block ADEF, I have in this particular instance provided four or more or less dwells, during each of which the yield of the linkage is given time for restitution. This means that the valve will not at EF receive a large bulk of energy released from the linkage but rather this energy will have dissipated itself in a number of small quantities during the dwell periods. To be sure, the phenomenon might still exist but to a much smaller degree; in fact, the effect of this phenomenon now becomes practically nil, by virtue of this feature of my present invention in co-ordination with the other feature above described.

In Fig. 2 of the present drawings I have illustrated a lift curve that embodies aperiodic acceleration. While, according to my present invention, the cam contour may be provided with one or more dwell portions, yet such a dwell portion would be so minute as to render it rather impractical to illustrate upon the cam surface itself. Also, the factors of velocity and acceleration must be taken into account and included in any illustration. For these reasons, I have here resorted to a graphic form of illustration of this feature and have indicated the corresponding dwell or dwells in Fig. 2 of the drawings. But even so, it will be observed that such dwell is not actually perceptible in the graphic representation of the lift curve, as illustrated in this figure of the drawings. These dwells are indicated at $d$.

As my second precaution in this connection, I have provided means for maintaining a little pressure in the linkage during the periods of restitution within the linkage. This is accomplished by means of spring 10, as indicated in Fig. 3 of the drawings. At the beginning of acceleration, spring 10 is compressed until a shoulder on the spherical part of element 7 contacts a co-acting shoulder on part 6. The energy stored in spring 10 is then ready to later extend the linkage an amount corresponding to any false play that may occur in the linkage. The existence of a small amount of pressure in the linkage prevents the clearance regulator from acting during the valve-lift period which, in some cases where no such provision is made, results in pumping open of the valves. Now, if the restitution of the yield during the dwell period should permit the valve to speed up beyond the velocity of the graph, then there might tend to develop a little slack in the linkage. Spring 10 however causes telescoping element 7 to follow so quickly that no untimely adjustment of member 6 can take place. Spring 10 in fact continues to exert pressure and no slack can occur in the linkage until the valve is closed and the clearance 11 has been fully established.

Thus the best result may be accomplished by an accurately functioning clearance regulator, such as is the subject matter in part of the present invention, when combined with my present provision in the cam contour, as also contemplated herein. For instance, in conventional mechanisms, the element 7 would at a given point of the cycle start to lift the valve and impose an impact upon the linkage; because of yield after only a few degrees of the cam shaft motion, the cam contour would start to move the linkage and impose undue pressure again a few degrees later. Before such undue pressure and consequently undue yield occur in the linkage, according to my present invention as herein disclosed, there may be provided a dwell in the cam contour to relieve the linkage momentarily of all acceleration; at which moment, there is quick restitution of the yield within the linkage rather than a forcing of the valve to a velocity higher than that determined by its relationship to the cam contour. Spring 10 helps to ensure that at no time will there be any slackness within the valve linkage. This provision of a dwell can be repeated a number of times during the valve-accelerating period, if so desired. However, the break-up of the first impulse, as a rule, suffices as the starting of the linkage requires by far the greatest effort.

This same treatment can be applied to the "retardation" period and thus it is possible to control or prevent rebound of the valve; which ensures increased efficiency of engine operation and longer operative condition of the mechanism.

Upon closing of the valve, spring 10 forces element 7 to telescope out of adjusting screw 6 until pin 6a comes to the end of slots 7a and the clearance 11 is established. During this telescoping, member 7 is free to move axially along its own axis a limited distance. Having attained a definite axial velocity relative to member 6, member 7 is urged by the inclination of or a curve 7a' in slots 7a to assume a rotary motion; and, while member 7 is being rotated in the one direction, member 6 is screwed a very small amount in the opposite direction into the part 3. The inclination of or the location of a curve 7a' in slots 7a is such that the progressing separation of members 6 and 7, due to the pressure of spring 10, effects the very slight screwing together of members 6 and 3. Finally the ends of slots 7a contact pin 6a and the separation of members 6 and 7 comes to a full stop with the full clearance 11 established. The pressure of spring 10 is fully arrested and the torque spring 12 is free to screw member 6 out of member 3 the entire amount which the two members have been screwed together minus that amount which the linkage may have expanded during one valve-lift.

Thus the present specific form of clearance regulator contributes to the smooth operation of the valve linkage; as for instance, the spring 10 helps to ensure that at no time will there be any slackness within the valve linkage; and the weight of this specific form of regulator is another contributing factor, as will now be explained.

As to the matter of mass of the reciprocating parts, my present invention makes it possible to keep down their weight inasmuch as the conventional manual adjusting means is utilized and converted into an automatic clearance regulator, as will appear from the present disclosure. It will be noted that the conventional manual adjusting screw has been replaced by two parts 6 and 7 co-acting through a pin 6a; and, since these two parts are hollow, they can be designed to weigh about the same or only very little more than the conventional solid adjusting screw. The conventional locking means, which consists of a nut or a bolt and nut, is here replaced by the light and simple springs 10 and 12 and the pin 16. These three parts together will be a little lighter than the conventional locking means. Consequently, the automatic adjustment can be made without adding any weight to the reciprocating valve linkage. Inasmuch as the clearance regulator will eliminate undue impacts and surge from the linkage, there may be safely effected an even further reduction in the weight of the linkage for a given or desired rigidity. Thus, with respect to the factor of weight in the elimination of surge, the situation is rendered favorable by my present form of clearance regulator.

As above noted, a further object of this invention is to facilitate the starting of the engine. This is accomplished by virtue of a particular motion within the clearance regulator which will quickly re-establish proper clearance that may have been lost while the motor has been at rest and perhaps cooled off considerably. To those who are familiar with such situations, this will no doubt be understood from the operation of the present clearance regulator as herein described and without further explanation.

Thus, in addition to easier starting of the engine, briefly mentioned herein, my present invention accomplishes other things in addition thereto. First, due to the dwell herein provided, the tendency of the valve to attain a speed higher than that determined by the graph will be very substantially reduced and likewise the danger of surge. Second, element 7 and spring 10 together ensure that no adjustment can take place while the valve is off of its seat, thereby avoiding the danger of pumping open of the valve.

To explain more fully—because of the member 7, the screw 6 is influenced by a torque derived from an initial pre-valve-lift motion and tends to move in a direction opposite to that of the linkage motion during that time, this having the effect of locking the threaded connection between the members 3 and 6 prior to the unseating of the valve. All linkage members remain firmly in contact from the instant the valve is lifted off of its seat until it is firmly seated again so that there will be no looseness to encourage false motion or surge or cause untimely adjustment of the regulator for a false clearance. Then, during post valve-lift linkage motion, this same provision in my mechanism is effective in causing member 6 automatically to move in the opposite direction relative to that of the linkage motion during that time so as to ensure clearance which in turn is removed automatically to the necessary extent and to a predetermined limit while the valve remains seated.

Also, in my present device, there is ensured a constant clearance while the valve is seated and also some tension within the linkage while the valve is off of its seat so as to be present in case the speed of the motor, during diving for instance, should rise above that for which the valve springs are designed.

Furthermore, my present clearance regulator is effective in automatically adjusting the clearance within the linkage, for every cam shaft revolution, to a minimum without ever causing the valve to be held open.

Thus, from the above, it will be seen that there is a definite co-ordination between the provision of a dwell or dwells in the cam contour and my specific form of clearance regulator in the accomplishment of the desired results.

Another advantage of this invention resides in the fact that the dwell or dwells, herein provided in the acceleration, will be effective also in breaking up of the effect of the load; and consequently the strain and fatigue will be reduced accordingly and the life of the parts will be lengthened by virtue of the consequent reduction of wear.

In a word, my present invention serves to increase the efficiency in the starting and following continued operation of the engine and to lengthen the life of the parts of the mechanism involved.

What I claim is:

1. In an internal combustion engine, in which the valve linkage of each valve is subject to alternating yield and restitution due to pressure therewithin during actual operation of the same, and including an individual cam for each valve for effecting the actuation of the valve linkage, each cam having a dwell portion provided in the cam flank itself thereof so as to permit the energy stored up in the linkage to spend itself and thereby reduce the danger of surge in the linkage operation.

2. In an internal combustion engine, in which the valve linkage is subject to alternating yield and restitution due to pressure therewithin during actual operation of the same, and including a cam for effecting actuation of the linkage, said cam having successive spaced dwell portions provided in the cam flank itself thereof so as to permit the energy stored up in the linkage to spend itself and thereby reduce the danger of surge in the linkage operation.

3. In an internal combustion engine, an automatically adjustable clearance regulator adapted for operation in the valve linkage thereof and comprising companion members having resiliently-acting inclined surface engagement with each other, with respect to the direction of linkage operation, for relative longitudinal adjustment between said members in either direction for either taking up or providing clearance, and resiliently-acting means extending in the path of the linkage operation and having plain surface engagement with one of said members and being capable of limited longitudinal movement with respect thereto so as to provide a fixed clearance, said means having operative connection with said one member for converting longitudinal pressure within the linkage into torque effective upon said one member and tending to move the same in a direction opposite to that of said resiliently-acting means, said parts being so constructed and arranged that all linkage members are locked prior to the unseating of the valve, remain firmly locked during the opening and closing of the valve, and are unlocked with subsequent removal of excess clearance after the valve has been closed.

4. In an internal combustion engine, an automatically adjustable clearance regulator adapted for operation in the valve linkage thereof and comprising companion members having resiliently-acting inclined surface interengagement, with respect to the direction of linkage operation, for relative longitudinal adjustment between said members in either direction for either taking up or providing clearance, and resiliently-acting means extending in the path of the linkage operation and having plain surface engagement with one of said members and being capable of limited longitudinal movement with respect thereto so as to provide a fixed clearance, there being provided pin and inclined slot engagement between said means and said one member for converting longitudinal pressure within the linkage into torque effective upon said one member and tending to move the same in a direction opposite to that of said resiliently-acting means, said parts being so constructed and arranged that all linkage members are locked prior to the unseating of the valve, remain firmly locked during the opening and closing of the valve, and are unlocked with subsequent removal of excess clearance after the valve has been closed.

5. In an internal combustion engine, an automatically adjustable clearance regulator adapted for operation in the valve linkage thereof and comprising companion members having inclined surface engagement with each other with respect to the direction of linkage operation for relative longitudinal adjustment between said members in either direction for either taking up or providing clearance, a torque spring effectively arranged between said members, and means extending in the path of the linkage operation and having plain surface engagement with one of said members and being capable of limited longitudinal movement with respect to the same so as to provide a fixed clearance, a spring for ensuring such clearance, said means having operative connection with said one member for converting longitudinal pressure within the linkage into torque effective upon said one member and tending to move the same in a direction opposite to that of said resiliently-acting means, said parts being so constructed and arranged that all linkage members are locked prior to the unseating of the valve, remain firmly locked during the opening and closing of the valve, and are unlocked with subsequent removal of excess clearance after the valve has been closed.

6. In an internal combustion engine, an automatically adjustable clearance regulator adapted for operation in the valve linkage thereof and comprising companion members having resiliently-acting inclined surface interengagement with respect to the direction of linkage operation for relative longitudinal adjustment between said members in either direction for either taking up or providing clearance, means for limiting the extent of such relative adjustment between said members, and resiliently-acting means extending in the path of the linkage operation and having plain surface engagement with one of said members and being capable of limited longitudinal movement with respect to the same so as to provide a fixed clearance, said last-named means having operative connection with said one member for converting longitudinal pressure within the linkage into torque effective upon said one member and tending to move the same in a direction opposite to that of said resiliently-acting means, said parts being so constructed and arranged that all linkage members are locked prior to the unseating of the valve, remain firmly locked during the opening and closing of the valve, and are unlocked with subsequent removal of excess clearance after the valve has been closed.

7. In an internal combustion engine, an automatically adjustable clearance regulator adapted for operation in the valve linkage thereof and comprising companion members having inclined surface interengagement with respect to the direction of linkage operation for relative longitudinal adjustment between said members in either direction for either taking up or providing clearance, a torque spring effectively arranged between said members, means for limiting the extent of such relative adjustment between said members, and resiliently-acting means extending in the path of the linkage operation and having plain surface engagement with one of said members and being capable of limited longitudinal movement with respect thereto so as to provide a fixed clearance, said last-named means having operative connection with said one member for converting longitudinal pressure within the linkage into torque effective upon said one member and tending to move the same in a direction opposite to that of said resiliently-acting means, said parts being so constructed and arranged that all linkage members are locked prior to the unseating of the valve, remain firmly locked during the opening and closing of the valve, and are unlocked with subsequent removal of excess clearance after the valve has been closed.

8. In an internal combustion engine, an automatically adjustable clearance regulator adapted for operation in the valve linkage thereof and comprising companion members having inclined surface interengagement with respect to the direction of linkage operation, for relative longitudinal adjustment between said members in either direction for either taking up or providing clearance, spring means effectively arranged between said members, adjustable means for limiting the extent of such relative adjustment between said members, and resiliently-acting means extending in the path of the linkage operation and having plain surface engagement with one of said members and being capable of limited longitudinal movement with respect thereto so as to provide a fixed clearance, said last-named means having operative connection with said one member for converting longitudinal pressure within the linkage into torque effective upon said one member and tending to move the same in a direction opposite to that of said resiliently-acting means, said parts being so constructed and arranged that all linkage members are locked prior to the unseating of the valve, remain firmly locked during the opening and closing of the valve, and are unlocked with subsequent removal of excess clearance after the valve has been closed.

9. In an internal combustion engine, an automatically adjustable clearance regulator adapted for operation in the valve linkage thereof and comprising companion members having inclined surface interengagement with respect to the direction of linkage operation for relative longitudinal adjustment between said members in either direction for either taking up or providing clearance, a torque spring normally tending to adjust said members so as to lengthen the regulator, one of said members having oppositely disposed ears for limiting the extent of relative movement therebetween, a transverse pin mounted in said other member and extending in the path of said ears for determining the limit of such relative movement, resiliently-acting means in the path of the linkage operation and having plain surface engagement with one of said members and being capable of limited longitudinal movement with respect thereto so as to provide a fixed clearance, said means having an inclined slot, and a transverse pin mounted in said one member and extending through said inclined slot so as to convert longitudinal pressure within the linkage into torque effective upon said one member and tending to move the same in a direction opposite to that of said resiliently-acting means, said torque spring being mounted at its ends upon said transverse pins, said parts being so constructed and arranged that all linkage members are locked prior to the unseating of the valve, remain firmly locked during the opening and closing of the valve, and are unlocked with subsequent removal of excess clearance after the valve has been closed.

10. In an internal combustion engine, an automatically adjustable clearance regulator adapted for operation in the valve linkage thereof and comprising companion members having screw-threaded interengagement with respect to the direction of linkage operation for relative longitudinal adjustment between said members in either direction for either taking up or providing clearance, an auxiliary member extending in the path of the linkage operation and having plain surface engagement with one of said members and being capable of limited longitudinal movement with respect thereto so as to provide a fixed clearance, said one member and said auxiliary member both being of hollow form, a torque spring located within said companion members and adapted normally to effect relative longitudinal extension therebetween, and a spring effectively arranged between said one companion member and said auxiliary member and located within the same so as to ensure clearance therebetween, said parts being so constructed and arranged that all linkage members are locked prior to the unseating of the valve, remain firmly locked during the opening and closing of the valve, and are unlocked with subsequent removal of excess clearance after the valve has been closed.

11. In an internal combustion engine, an automatically adjustable clearance regulator adapted for operation in the valve linkage thereof and comprising an internally screw-threaded hollow end portion of the rocker arm, a hollow companion member having screw-threaded engagement within the end of said rocker arm, a hollow auxiliary member having plain surface engagement within the inner one of said companion members and having an enlarged shoulder at the end thereof for engagement with the adjacent end of said inner companion member so as to limit the extent of movement thereof therewithin, pin and slot means of interengagement between said one companion member and said auxiliary member for converting longitudinal pressure within the linkage into torque effective upon said one companion member and tending to move the same in a direction opposite to that of said auxiliary member, spring means normally tending to force said auxiliary member outwardly to ensure the formation of clearance, and torque spring means arranged between said companion members so as to normally effect relative longitudinal extension therebetween, said spring means being located within said hollow members, said parts being so constructed and arranged that all linkage members are locked prior to the unseating of the valve, remain firmly locked during the opening and closing of the valve, and are unlocked with subsequent removal of excess clearance after the valve has been closed.

12. In an internal combustion engine, an automatically adjustable clearance regulator adapted for operation in the valve linkage thereof and comprising companion members having resiliently-acting inclined surface interengagement with respect to the direction of linkage operation, for relative longitudinal adjustment between said members in either direction for either taking up or providing clearance, and resiliently-acting means extending in the path of the linkage operation and being capable of longitudinal movement with respect to one of said members, said means having operative connection with said one member for converting longitudinal pressure within the linkage into torque effective upon said one member and tending to move the same in a direction opposite to that of said resiliently-acting means, said parts being so constructed and arranged that all linkage members are locked prior to the unseating of the valve, remain firmly locked during the opening and closing of the valve, and are unlocked with subsequent removal of excess clearance after the valve has been closed.

13. In an internal combustion engine, an automatically adjustable clearance regulator adapted for operation in the valve linkage thereof and comprising companion members having inclined surface interengagement with respect to the direction of linkage operation, for relative longitudinal adjustment between said members in either direction for either taking up or providing clearance, a spring tending normally to effect relative longitudinal extension between said members, and means extending in the path of the linkage operation and being capable of longitudinal movement with respect to one of said members, said means having operative connection with said one member for converting longitudinal pressure within the linkage into torque effective upon said one member and tending to move the same in a direction opposite to that of said means, and a spring effectively arranged between said one member and said means and tending normally to effect longitudinal extension therebetween, said parts being so constructed and arranged that all linkage members are locked prior to the unseating of the valve, remain firmly locked during the opening and closing of the valve, and are unlocked with subsequent removal of excess clearance after the valve has been closed.

14. In an internal combustion engine in which the valve linkage comprises intake and exhaust valves each of which is subject to alternating yield and restitution incident to pressure within said linkage during actual operation of the same, and including cam means for effecting actuation of the valve linkage, said cam means having the cam flank thereof so formed as to produce a dwell in the operation of each of said intake and exhaust valves so as to permit the energy stored up in the linkage to spend itself and thereby reduce the danger of surge in the linkage operation.

15. In an internal combustion engine in which the valve linkage comprises intake and exhaust valves each of which is subject to alternating yield and restitution incident to pressure within said valve linkage during actual operation of the same, and including cam means for effecting the actuation of the valve linkage, said cam means being provided with dwell portions in the cam flank itself so as to produce dwells in the operation of each of said intake and exhaust valves and thereby permit the energy stored up in the linkage to spend itself and thereby reduce the danger of surge in the linkage operation.

16. In an internal combustion engine in which the valve linkage comprises intake and exhaust valves each of which is subject to alternating yield and restitution incident to pressure within the valve linkage during actual operation of the same, and including cam means for effecting actuation of the valve linkage, there being a separate cam for each of said valves, and each of said cams being provided with dwell portions in the cam flank itself thereof so as to produce dwells in the operation of each of said intake and exhaust valves and thereby permit the energy stored up in the linkage to spend itself and thereby reduce the danger of surge in the linkage operation.

17. In an internal combustion engine in which the valve linkage is subject to alternating yield and restitution incident to pressure within said linkage during actual operation of the same, the combination of an automatically adjustable clearance regulator adapted for operation in the valve linkage, said regulator comprising interengaging companion members capable of relative longitudinal adjustment in either direction for either taking up or providing clearance, a cam for effecting actuation of the valve linkage, said cam having a dwell portion provided in the cam flank itself thereof so as to permit the energy stored up in linkage to spend itself and thereby reduce the danger of surge in the linkage operation, and spring means arranged between said members and tending normally to effect relative extension of the same so as to thereby prevent the occurrence of slackness in the linkage at any time.

OTTO M. BURKHARDT.